May 27, 1924.
T. J. KEHOE
UNIVERSAL JOINT
Filed March 29, 1917
1,495,327
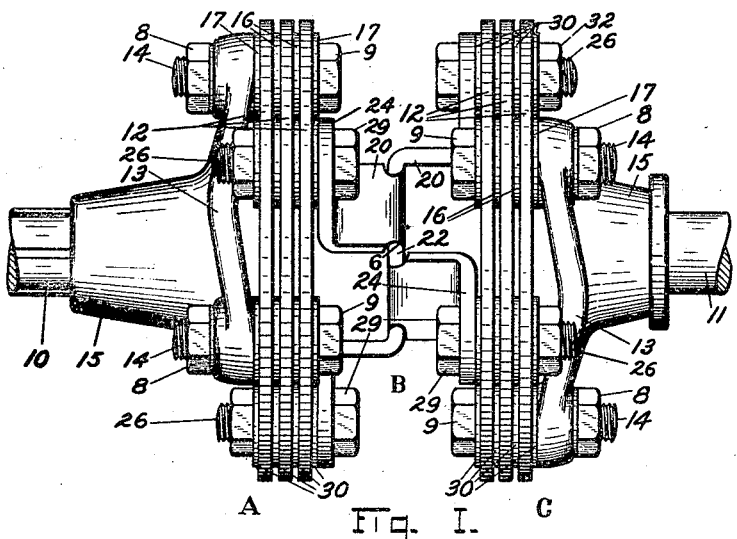
Fig. I.
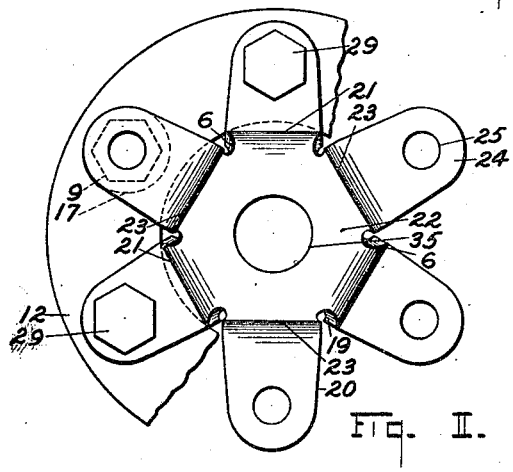
Fig. II.
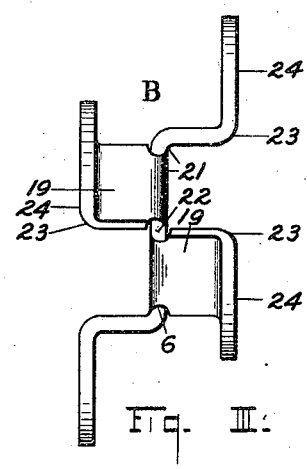
Fig. III.
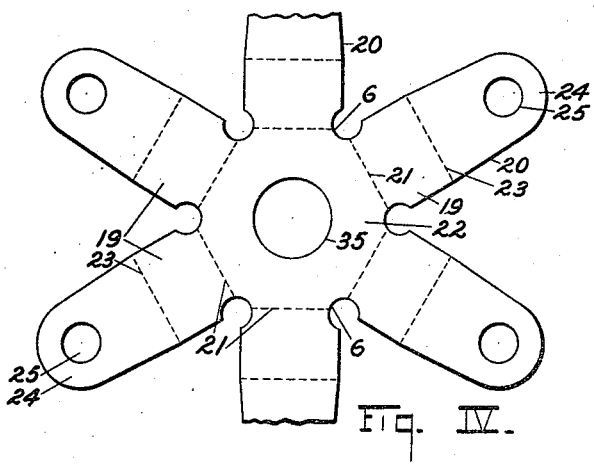
Fig. IV.
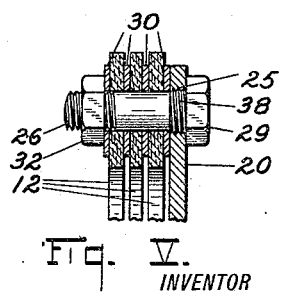
Fig. V.
INVENTOR
Thomas J. Kehoe
BY Chester H. Braselton
ATTORNEY Patented May 27, 1924.

1,495,327

UNITED STATES PATENT OFFICE.

THOMAS J. KEHOE, OF TOLEDO, OHIO, ASSIGNOR TO THE WILLYS-OVERLAND COMPANY, OF TOLEDO, OHIO, A CORPORATION OF OHIO.

UNIVERSAL JOINT.

Application filed March 29, 1917. Serial No. 158,193.

*To all whom it may concern:*

Be it known that I, THOMAS J. KEHOE, a citizen of the United States, residing at Toledo, county of Lucas, State of Ohio, have invented new and useful Improvements in Universal Joints, of which the following is a specification.

This invention relates to improvements in universal joints or flexible connections between two shafts or shaft sections, or the like, to compensate for the continually changing alignment of such parts, while allowing perfect freedom to the parts in their rotating movement.

The main object of this invention is to provide a novel frame for connecting two flexible parts of the universal joint.

Further objects, and objects relating to economies of manufacture and details of construction, will definitely appear from the detailed description to follow:

I accomplish the objects of my invention by the devices and means described in the following specification: My invention is clearly defined and pointed out in the appended claims:

A structure constituting a preferred embodiment of my invention is illustrated in the accompanying drawing, forming a part of this specification, in which:

Figure 1 is a side elevation of a universal joint embodying the present invention;

Figures 2 and 3, respectively, are plan and side elevations of the frame constituting the subject matter of the present invention. In Figure 2 a portion of one of the flexible parts of the joint is shown attached to the frame;

Figure 4 shows a blank of metal which is shaped, preferably by stamping, to form the connecting frame; and Figure 5 is a detail sectional view taken centrally and longitudinally through one of the arms of Figure 2.

In general the universal joint comprises a flexible part A mounted on one end of a shaft or shaft section 10 and connected by frame B to a like flexible part C mounted on the end of the other shaft or shaft section 11. Each flexible part A and C of the clutch comprises three flexible rings 12, preferably of leather. Each shaft 10 and 11 carries a boss 15 having a web 13 upon which the flexible rings 12 are mounted by means of bolts 14 and nuts 8. Washers 16 are mounted on the bolts 14 between the rings 12 of each part A and C to properly space the rings. Washers 17 are also mounted between the heads 9 of the bolts and the ring next to such heads and between the web 13 and the ring next to the web.

The frame B is cut by a suitable die out of metal and stamped into the shape shown in Figures 1, 2 and 3. The frame has six equidistant projecting arms 20. It is understood, of course, that the number of arms may be varied if desired. Alternate arms are bent at 21 in opposite directions so that the portions 19 of the arms form right angles with the central portion 22 of the frame. The blank, shaped to form the frame B, is cut away at 6 to permit the arms to be bent in opposite directions without tearing the metal, which would occur at the points of intersection of the arms due to the thickness of the metal if the frame was not cut away. Each of the arms is also bent at 23 so that they form right angles, and the outer portions 24 of the arms project away from the central portion 22. Each arm is provided with an opening 25.

The arms projecting from one side of the central portion 22 are connected to the flexible rings 12 of part C of the clutch, and the other three arms are connected to the flexible rings 12 of part A of the clutch. The arms are connected to the flexible rings by means of bolts 26, (Fig. 5), which project through the openings 25 in the arms 20, and through similar openings in the flexible rings 12. In order to make a stronger bearing for the bolts 26 in the openings 25, the openings are internally threaded and the threaded portions 38 of the bolts are screwed therein, and the nuts 29, screwed on the threaded portions 38 of the bolts, are preferably welded to the arms 20 and to the bolts to prevent the bolts and nuts from working loose. Washers 30 are mounted on the bolts between the rings 12, and between the rings and the arms 20, and the nuts 32, screwed on the ends of the bolts opposite the ends on which the nuts 29 are screwed. An opening 35 is formed in the center of the frame B to make it lighter.

The bolts 26 of each part A and C are preferably equidistant between the bolts 14 of the corresponding part. The bolts 14 of each part A and C are in axial alignment with the bolts 26 of the other part of the joint when the shafts 10 and 11 are in axial alignment.

From the above it can be seen that when the axes of the shafts 10 and 11 move out of alignment the portions of the rings 12 between the bolts 14 of each part A and C are moved laterally because of the yielding nature of the rings, thereby allowing movement of the shafts out of axial alignment to a greater or less extent while permitting rotation of the shafts. The frame B forms a rigid connection between the two parts A and C of the joint and this frame is very simple, efficient, and cheap to manufacture.

This invention finds ready application to many structures in which two shafts or shaft sections are to be united, as the device will allow such parts perfect freedom of rotary movement while the parts may not be strictly in axial alignment. The device is especially adapted for use in motor vehicles in which the different parts are more or less likely to be slightly out of alignment in the assembling of the mechanism, and in which they are frequently temporarily thrown out of alignment during operation of the vehicle.

I am aware that the embodiment of my invention here shown and described is susceptible of considerable variation without departing from the spirit and scope thereof, and therefore, I desire to claim the same broadly as indicated by the appended claims. I have found, however, that this particular embodiment is desirable from many standpoints, and therefore, I desire to claim the same specifically as well as broadly as will appear from the appended claims.

Having thus described my invention, what I claim as new and desire to secure by Letters Patent is:

1. A universal joint embodying two yieldable parts; a separate frame for each of said yieldable parts having spaced arms connected with and supporting the same; and a connecting frame of metal, stamped to form right angled projections extending alternately in opposite directions from a central portion, the projections on each side of the central portion being connected to one of said yielding parts between the arms of the supporting frame therefor.

2. A universal joint embodying two yieldable parts, consisting of a plurality of yielding rings; a separate frame for each of said yieldable parts having spaced arms connected with and supporting the same; and a connecting frame of metal stamped to form right angled projections extending alternately in opposite directions from a central portion, the projections on each side of the central portion being connected to the rings of one of the yielding parts between the arms of the supporting frame therefor.

3. A universal joint embodying two yieldable parts; a separate frame for each of said yieldable parts having spaced arms connected with and supporting the same; and a stamped metal connecting frame positioned between the yielding parts and provided with angular projections extending alternately in opposite directions from the central portion thereof, the projections on each side of the central portion being connected to one of said yielding parts between the arms of the supporting frame therefor.

4. A universal joint comprising two yieldable parts; a separate frame for each of said yieldable parts having spaced arms connected with and supporting the same; and a connecting frame of metal of substantially uniform thickness throughout, the connecting frame being provided with a plurality of angular projections extending alternately in opposite directions from the central portion thereof, the projections on each side of the central portion being connected to one of said yielding parts between the arms of the supporting frame therefor..

5. A universal joint embodying two yieldable parts, a separate frame for each of said yieldable parts having spaced arms connected with and supporting the same, a stamped metal connecting frame positioned between said yieldable parts having a central plate portion provided with L-shaped arms extending on opposite sides thereof, the extremities of the arms lying in planes substantially parallel to said plate portion and means connecting said extremities to said yieldable members intermediate the arms of said first mentioned frames.

6. A universal joint comprising two yieldable parts, a separate frame for each of said parts having spaced arms secured to the same, a sheet metal connecting frame positioned between said parts and having a central plate portion with a plurality of arms radiating therefrom, the extremities of alternate arms being bodily displaced axially from said plate portion with their outer faces secured against the adjacent face of one of said yieldable parts.

7. A universal joint comprising two yieldable parts, a separate frame for each of said parts having spaced arms secured to the same, a sheet metal connecting frame positioned between said parts having a central plate portion with a plurality of arms radiating therefrom, adjacent arms being oppositely bent away from the plane of said plate portion, the outer faces of alternate arms lying in a plane substantially parallel to said plate portion and secured to the adjacent yieldable part.

In witness whereof I affix my signature.

THOMAS J. KEHOE.